United States Patent
Pan et al.

(10) Patent No.: US 12,494,926 B2
(45) Date of Patent: Dec. 9, 2025

(54) QUIC TRANSPORT PROTOCOL-BASED COMMUNICATION METHOD AND SYSTEM

(71) Applicant: SHANGHAI BILIBILI TECHNOLOGY CO., LTD., Shanghai (CN)

(72) Inventors: Xiaowan Pan, Shanghai (CN); Sheng Wang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 289 days.

(21) Appl. No.: 17/768,831

(22) PCT Filed: Aug. 18, 2020

(86) PCT No.: PCT/CN2020/109872
§ 371 (c)(1),
(2) Date: Apr. 13, 2022

(87) PCT Pub. No.: WO2021/073247
PCT Pub. Date: Apr. 22, 2021

(65) Prior Publication Data
US 2023/0247007 A1 Aug. 3, 2023

(30) Foreign Application Priority Data
Oct. 14, 2019 (CN) .......................... 201910974065.9

(51) Int. Cl.
*H04L 69/164* (2022.01)
*H04L 9/40* (2022.01)

(52) U.S. Cl.
CPC ............ *H04L 9/40* (2022.05); *H04L 63/0428* (2013.01); *H04L 69/164* (2013.01)

(58) Field of Classification Search
CPC ...... H04L 9/40; H04L 63/0428; H04L 69/164
(Continued)

(56) References Cited

U.S. PATENT DOCUMENTS 10,122,606 B1 * 11/2018 Korhonen ............... H04L 43/08
2003/0182548 A1 * 9/2003 Xiong ................. H04L 12/2859
713/153
(Continued)

FOREIGN PATENT DOCUMENTS

CN 104283854 A 1/2015
CN 109309685 A 2/2019
(Continued)

OTHER PUBLICATIONS

International Patent Application No. PCT/CN2020/109872; Int'l Search Report; dated Nov. 19, 2020; 2 pages.
(Continued)

*Primary Examiner* — Suraj M Joshi
*Assistant Examiner* — Sherman Lin
(74) *Attorney, Agent, or Firm* — BakerHostetler

(57) ABSTRACT

The present disclosure provides communication techniques based on QUIC transport protocol. The communication techniques comprise receiving a first handshake message sent by a client computing device; defining a second handshake message in response to the first handshake message, wherein the second handshake message includes an encrypted-transport tag and a plaintext-transport tag; sending the second handshake message to the client computing device for selecting, based on the second handshake message, a target transport mode from a plurality of transport modes; receiving a third handshake message sent by the client computing device, where the third handshake message includes identification information of the target transport mode; and performing data transport based on the target transport mode.

20 Claims, 10 Drawing Sheets

(58) Field of Classification Search
USPC .......................................... 709/227; 713/168
See application file for complete search history.

(56) References Cited

U.S. PATENT DOCUMENTS

| | | | |
|---|---|---|---|
| 2003/0226017 A1* | 12/2003 | Palekar | ............... H04L 63/0428 |
| | | | 713/168 |
| 2014/0304498 A1* | 10/2014 | Gonuguntla | ........ H04L 63/0281 |
| | | | 713/151 |
| 2019/0199835 A1 | 6/2019 | Deval et al. | |
| 2019/0229903 A1 | 7/2019 | Balasubramanian et al. | |
| 2020/0092090 A1* | 3/2020 | Lin | ....................... H04L 9/3242 |

FOREIGN PATENT DOCUMENTS

| | | |
|---|---|---|
| CN | 110149388 A | 8/2019 |
| CN | 110278183 A | 9/2019 |
| WO | WO 2018/076183 A1 | 5/2018 |
| WO | WO 2019/002754 A1 | 1/2019 |

OTHER PUBLICATIONS

3rd Generation Partnership Project; Technical Specification Group Core Network and Terminals; Study on IETF QUIC Transport for 5GC Service Based Interfaces; (Release 16); TR 29.893 V1.2.0; Jun. 2019; 39 pages.
Thomson et al.; "Using TLS to Secure QUIC"; Internet Engineering Task Force; May 2021; 57 pages.
Iyengar et al.; "Quic: A UDP-Based Multiplexed and Secure Transport"; Internet Engineering Task Force; May 2021; 168 pages.

* cited by examiner

QUIC TRANSPORT PROTOCOL-BASED COMMUNICATION METHOD AND SYSTEM

CROSS-REFERENCE TO RELATED APPLICATION

This application is the U.S. National Stage of International Application No. PCT/CN2020/109872, filed on Aug. 18, 2020, which claims priority to Chinese Patent Application No. 201910974065.9 filed on Oct. 14, 2019, and entitled "QUIC transport protocol-based Communication method and system", which is incorporated by reference in its entirety.

TECHNICAL FIELD

Embodiments of the present application relate to the technical field of communications, and in particular to a QUIC transport protocol-based communication method and system, a device, and a computer-readable storage medium.

BACKGROUND

The HTTP protocol, which is based on TCP, is a most widely used network protocol on the Internet, and is used to transfer hypertext markup language (HTML) documents from a server to a computer device. However, with the increase of images, videos, and other multimedia content, HTML pages become increasingly complex due to the increased multimedia content, and page loading requires a time longer than ever before. In the context described above, the QUIC (Quick UDP Internet Connections) transport protocol was proposed. QUIC is a low-latency Internet transport layer protocol based on UDP and has many advantages, such as reducing a connection delay, avoiding head-of-line blocking, and multiplexing.

QUIC is a new type of Internet transport protocol with default encryption, providing a series of improved designs that speed up HTTP transport and can ensure transport security. Specifically, QUIC uses the Diffie-Hellman algorithm, which enables a client terminal and a server terminal to obtain a communication key after only one negotiation, and achieve 0-RTT for subsequent connections with reference to a local buffer of the client terminal. However, the applicant comes to the following conclusion through experiments: Compared with TCP+TLS/SSL used by HTTPS, a QUIC based default data encryption service makes CPU overheads of the server terminal is twice as higher as those of a data encryption service based on HTTPS. Therefore, how to not only make full use of transport advantages of the QUIC transport protocol, but also reduce resource consumption caused by the data encryption service has become one of the research directions of various parties.

It should be noted that the above content is not used to limit the scope of protection of the present application.

SUMMARY

An objective of the embodiments of the present application is to provide a communication method and system, a computer device, and a computer-readable storage medium, so as to solve the technical problem of high resource overheads in QUIC transport protocol-based communication and transport.

An aspect of the embodiments of the present application provides a QUIC transport protocol-based communication method, where the communication method includes: receiving a first handshake message sent by a client computing device; generating a second handshake message in response to the first handshake message, where the second handshake message includes an encrypted-transport tag and/or a plaintext-transport tag; sending the second handshake message to the client computing device for the client computing device to select, based on the second handshake message, a target transport mode from a plurality of transport modes, where the plurality of transport modes include an encrypted-transport mode corresponding to the encrypted-transport tag and a plaintext-transport mode corresponding to the plaintext-transport tag; receiving a third handshake message sent by the client computing device, where the third handshake message includes identification information of the target transport mode; and performing data transport based on the target transport mode.

Preferably, the second handshake message includes a configuration parameter of the server computing device, and the plaintext-transport tag is configured in an encryption algorithm option of the configuration parameter.

Preferably, the identification information includes the encrypted-transport tag provided by the second handshake message; and performing data transport based on the target transport mode includes: generating a fourth handshake message in response to the third handshake message, to establish, with the client computing device, a QUIC connection for the encrypted-transport mode.

Preferably, the identification information includes the plaintext-transport tag provided by the second handshake message; and performing data transport based on the target transport mode includes: generating a fourth handshake message in response to the third handshake message, to establish, with the client computing device, a QUIC connection for the plaintext-transport mode.

An aspect of the embodiments of the present application further provides a QUIC transport protocol-based communication method, where the communication method includes: sending a first handshake message to a server computing device; receiving a second handshake message returned by the server computing device, where the second handshake message includes an encrypted-transport tag and/or a plaintext-transport tag; selecting a target transport mode from a plurality of transport modes based on the second handshake message, where the plurality of transport modes include an encrypted-transport mode corresponding to the encrypted-transport tag and a plaintext-transport mode corresponding to the plaintext-transport tag; generating a third handshake message based on the target transport mode; and sending the third handshake message to the server computing device, to establish, based on the third handshake message, a QUIC connection with the server computing device.

Preferably, the second handshake message includes a configuration parameter of the server computing device, and the plaintext-transport tag is configured in an encryption algorithm option of the configuration parameter.

Preferably, selecting the target transport mode from the plurality of transport modes based on the second handshake message includes: parsing the second handshake message to obtain the configuration parameter of the server computing device; detecting whether the plaintext-transport tag is in the configuration parameter; and selecting the plaintext-transport mode if the plaintext-transport tag is in the configuration parameter.

Preferably, generating the third handshake message based on the target transport mode includes: generating the third handshake message based on the plaintext-transport tag if the target transport mode is the plaintext-transport mode.

Preferably, the method further includes: controlling an encrypter and/or a decrypter to enter a non-encryption mode to process subsequent application data by the encrypter and/or the decrypter in the non-encryption mode, and to send the processed application data to the server computing device.

Preferably, generating the third handshake message based on the target transport mode includes: generating the third handshake message based on the encrypted-transport tag if the target transport mode is the encrypted-transport mode.

Preferably, sending the third handshake message to the server computing device, to establish, based on the third handshake message, a QUIC connection with the server computing device includes: sending the third handshake message to the server computing device; and receiving a fourth handshake message returned by the server computing device, to establish the QUIC connection with the server computing device.

An aspect of the embodiments of the present application further provides a QUIC transport protocol-based communication method, where the communication method includes: detecting whether a configuration parameter for a server computing device is in a buffer, where the configuration parameter includes an encrypted-transport tag and/or a plaintext-transport tag; if the configuration parameter is in the buffer, selecting, based on the configuration parameter in the buffer, a target transport mode from a plurality of transport modes, where the plurality of transport modes include an encrypted-transport mode corresponding to the encrypted-transport tag and a plaintext-transport mode corresponding to the plaintext-transport tag; generating a full CHLO message based on the target transport mode, where the full CHLO message is used to request the server computing device to generate a forward secure key; and sending the full CHLO message to the server computing device, so as to establish, based on the full CHLO message, a QUIC connection with the server computing device.

Preferably, if the configuration parameter is not included in the buffer, the method includes: generating an inchoate CHLO message and sending the inchoate CHLO message to the server computing device, where the inchoate CHLO message is used to request the server computing device to return the configuration parameter; receiving the configuration parameter returned by the server computing device, where the configuration parameter includes the encrypted-transport tag and/or the plaintext-transport tag; and selecting the target transport mode from the plurality of transport modes based on the configuration parameter returned by the server computing device.

An aspect of the embodiments of the present application further provides a QUIC transport protocol-based communication system, where the communication system includes: a receiving module for receiving a first handshake message sent by a client computing device; a generating module for generating a second handshake message in response to the first handshake message, where the second handshake message includes an encrypted-transport tag and/or a plaintext-transport tag; a sending module for sending the second handshake message to the client computing device for the client computing device to select, based on the second handshake message, a target transport mode from a plurality of transport modes, where the plurality of transport modes include an encrypted-transport mode corresponding to the encrypted-transport tag and a plaintext-transport mode corresponding to the plaintext-transport tag; and a data transport module for performing data transport based on the target transport mode.

An aspect of the embodiments of the present application further provides a QUIC transport protocol-based communication system, where the communication system includes: a first sending module for sending a first handshake message to a server computing device; a receiving module for receiving a second handshake message returned by the server computing device, where the second handshake message includes an encrypted-transport tag and/or a plaintext-transport tag; a selection module configured to select, based on the second handshake message, a target transport mode from a plurality of transport modes, where the plurality of transport modes include an encrypted-transport mode corresponding to the encrypted-transport tag and a plaintext-transport mode corresponding to the plaintext-transport tag; a generating module for generating a third handshake message based on the target transport mode; and a second sending module for sending the third handshake message to the server computing device, to establish, based on the third handshake message, a QUIC connection with the server computing device.

An aspect of the embodiments of the present application further provides a computer device, where the computer device includes a memory, a processor, and computer-readable instructions that are stored in the memory and can be run on the processor, and when the processor executes the computer-readable instructions, the steps of the foregoing QUIC transport protocol-based communication method are implemented.

An aspect of the embodiments of the present application further provides a computer-readable storage medium, where the computer-readable storage medium stores computer-readable instructions, and the computer-readable instructions can be executed by at least one processor, so that the at least one processor performs the steps of the foregoing QUIC transport protocol-based communication method.

An aspect of the embodiments of the present application further provides a communication system, and the communication system includes a client computing device and a server computing device, where the client computing device is used to send a first handshake message to the server computing device; the server computing device is used to receive the first handshake message, generate a second handshake message based on the first handshake message, and to return the second handshake message to the client computing device, where the second handshake message includes an encrypted-transport tag and/or a plaintext-transport tag; the client computing device is used to receive the second handshake message and select, based on the second handshake message, a target transport mode from a plurality of transport modes, where the plurality of transport modes include an encrypted-transport mode corresponding to the encrypted-transport tag and a plaintext-transport mode corresponding to the plaintext-transport tag; the client computing device is used to define a third handshake message based on the target transport mode and send the third handshake message to the server computing device; and the server computing device is used to receive the third handshake message, generate a fourth handshake message based on the third handshake message, and to return the fourth handshake message to the client computing device, so as to establish and perform a QUIC connection corresponding to the target transport mode between the client computing device and the server computing device.

According to the communication method and system, the device, and the computer-readable storage medium provided in the embodiments of the application, a plurality of transport modes including encrypted/plaintext modes are provided. The client computing device independently selects a transport mode according to its own needs, so as to achieve technical compatibility with the original QUIC transport protocol. It is easily understood that according to the technical solutions, a plaintext-transport mode is added to a framework of the QUIC transport protocol, and the plaintext-transport mode may be selected when there is no encryption requirement, thereby not only ensuring transport advantages of the QUIC transport protocol, but also reducing resource consumption caused by a data encryption service, for example, reducing CPU overheads.

DETAILED DESCRIPTION OF EMBODIMENTS

In order to make the objectives, technical solutions, and advantages of the present application clearer, the present application will be further described in detail below in conjunction with the accompanying drawings and embodiments. It should be understood that the specific embodiments described herein are merely intended to explain the present application, but are not intended to limit the present application. All other embodiments obtained by persons of ordinary skill in the art based on the embodiments of the present application without creative efforts shall fall within the scope of protection of the present application.

It should be noted that the descriptions related to "first", "second", etc. in the present application are merely used for the illustrative purpose, and should not be construed as indicating or implying the relative importance thereof or implicitly indicating the number of technical features indicated. Therefore, a feature defined by "first" or "second" may explicitly or implicitly includes at least one feature. Additionally, technical solutions in various embodiments may be combined with each other, provided that they can be implemented by persons of ordinary skill in the art. When a combination of the technical solutions incurs conflict or cannot be implemented, it should be considered that such a combination of the technical solutions does not exist, and does not fall within the claimed scope of protection of the present application either.

Embodiment 1

Figure 1:
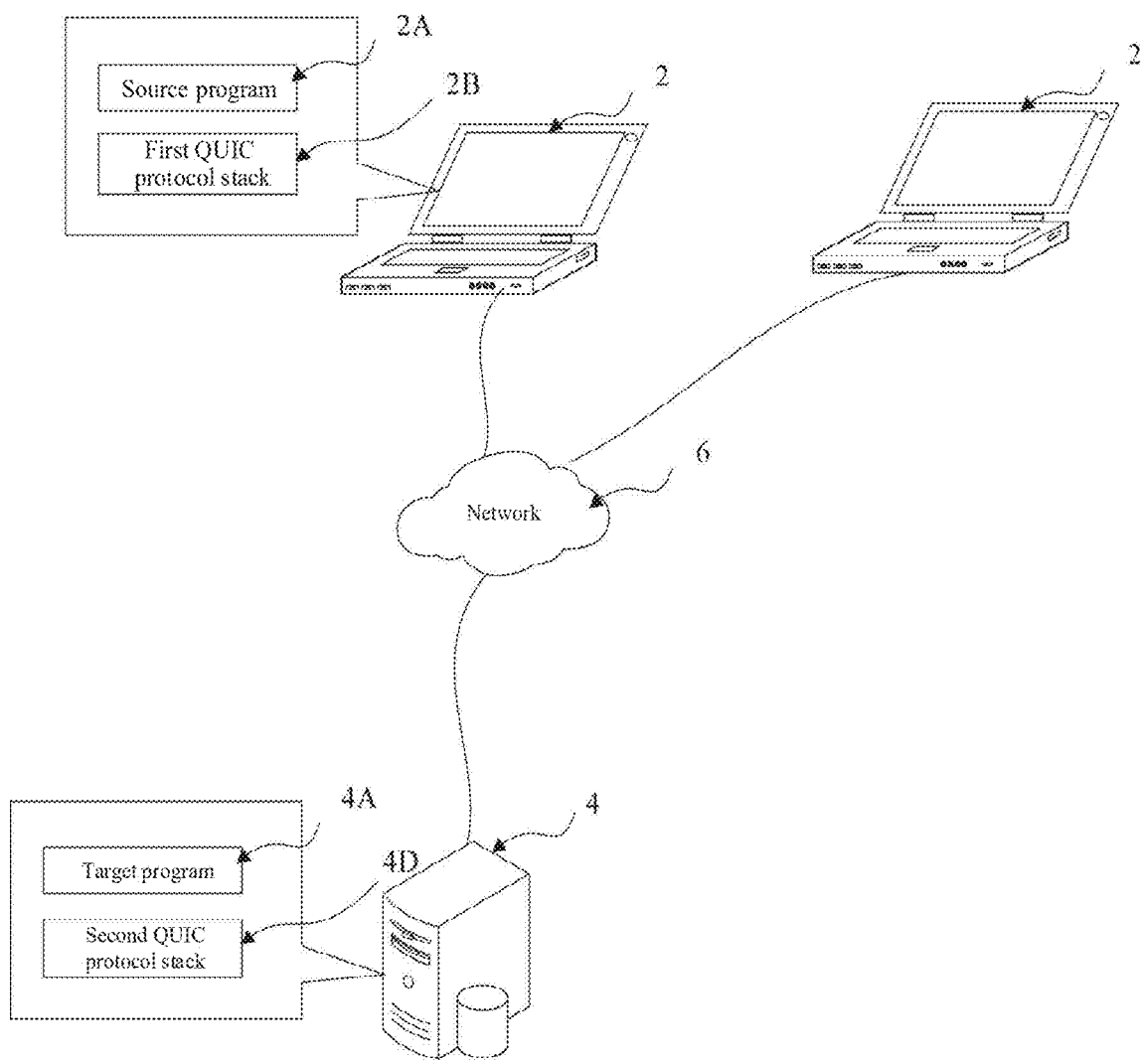
FIG. 1 schematically shows a schematic diagram of an architecture of a QUIC transport protocol-based communication system according to Embodiment 1 of the present application.

FIG. 1 schematically shows a schematic diagram of an architecture of a QUIC transport protocol-based communication system according to Embodiment 1 of the present application. In an exemplary embodiment, the communication system includes at least one client computing device 2 and at least one server computing device 4, and the client computing device 2 can establish a network connection with the server computing device 4 via a network 6. The client computing device 2 and the server computing device 4 each may be a computer device such as a server, a mobile phone, a tablet personal computer, or a laptop computer. The network 6 may be the Internet.

In an exemplary embodiment, the client computing device 2 has a built-in application (such as a browser 2A) and first QUIC transport protocol stack 2B. The server computing device 4 has a built-in application (such as a Web service program 4A) and second QUIC transport protocol stack 4B.

In an exemplary embodiment, the communication system is specifically as follows:

The client computing device 2 is used to send a first handshake message to the server computing device 4.

The server computing device 4 is used to receive the first handshake message, generate a second handshake message based on the first handshake message, and to return the second handshake message to the client computing device 2, where the second handshake message includes an encrypted-transport tag and/or a plaintext-transport tag.

The client computing device 2 is used to receive the second handshake message and select, based on the second handshake message, a target transport mode from a plurality of transport modes, where the plurality of transport modes include an encrypted-transport mode corresponding to the encrypted-transport tag and a plaintext-transport mode corresponding to the plaintext-transport tag.

The client computing device 2 is used to define a third handshake message based on the target transport mode and send the third handshake message to the server computing device.

The server computing device 4 is used to receive the third handshake message, generate a fourth handshake message based on the third handshake message, and to return the fourth handshake message to the client computing device, so as to establish and perform a QUIC (quick UDP Internet Connections) connection corresponding to the target transport mode between the client computing device and the server computing device.

Figure 2:
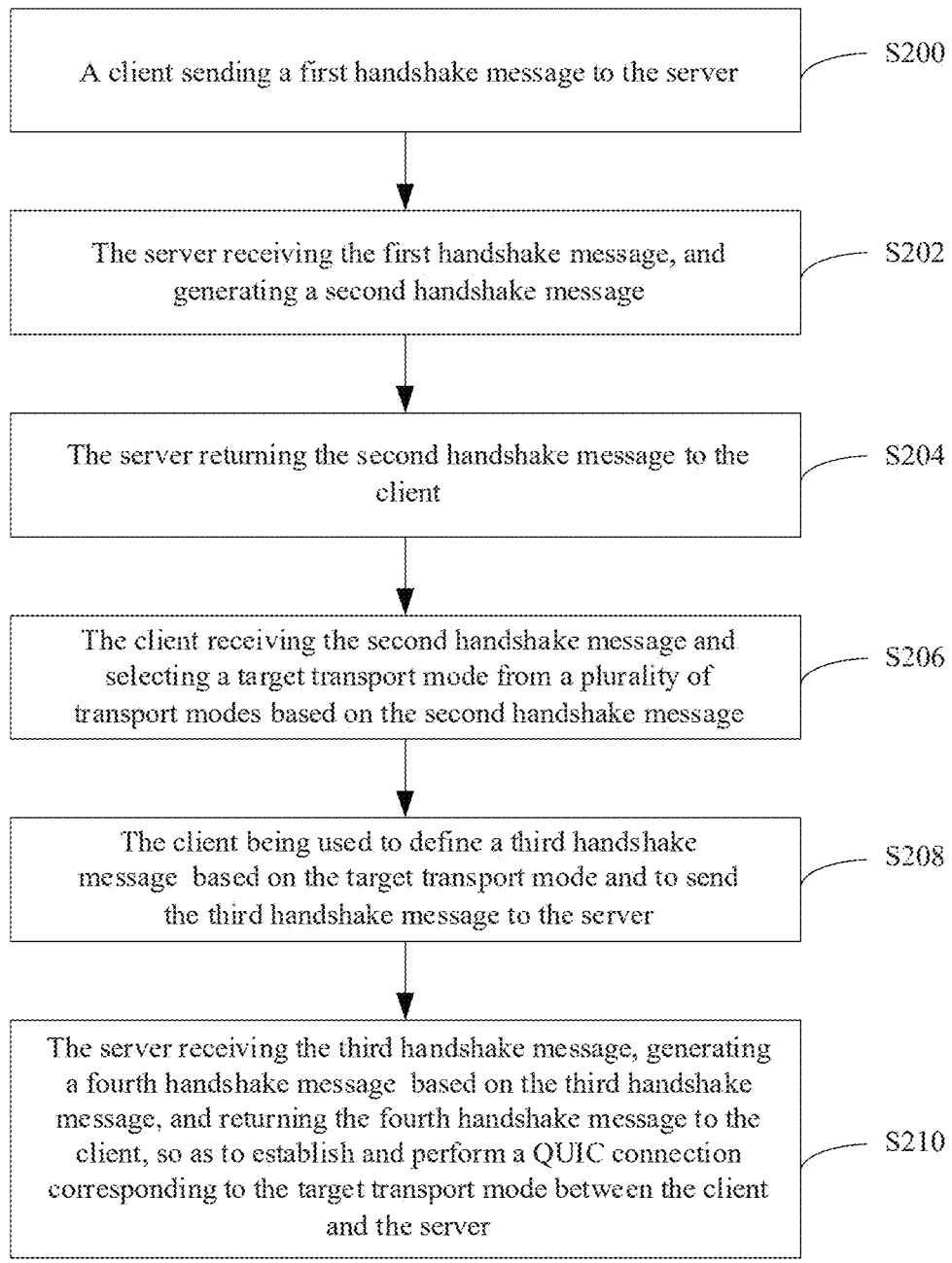
FIG. 2 schematically shows a schematic flowchart of operations of a QUIC transport protocol-based communication system according to Embodiment 1 of the present application.
Figure 3:
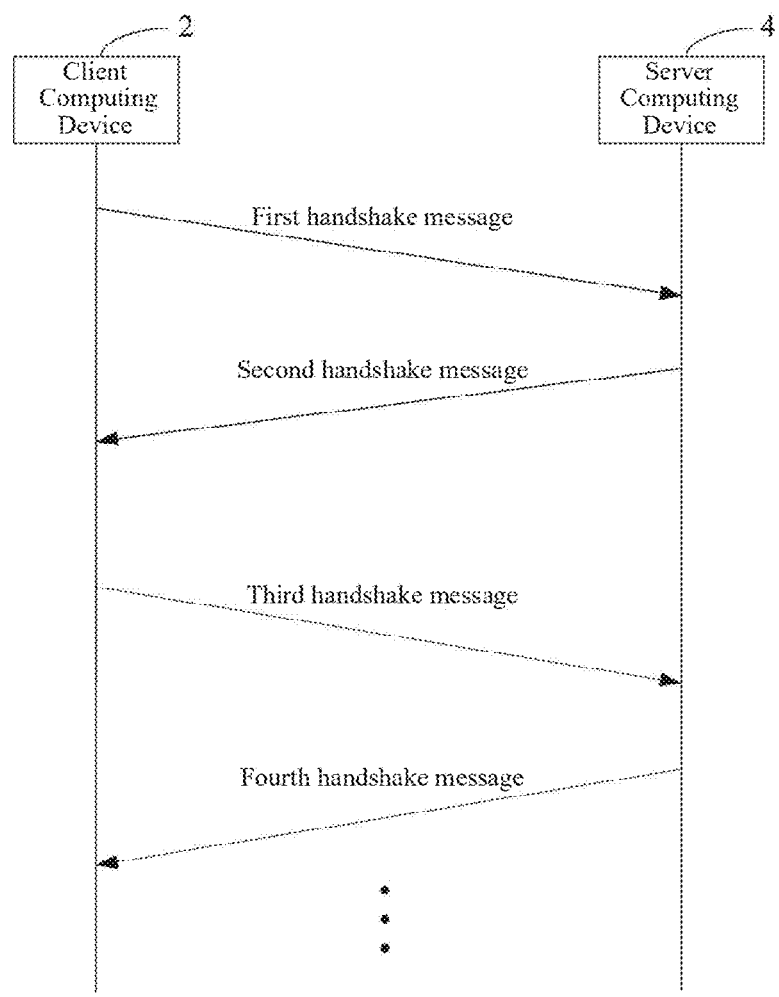
FIG. 3 schematically shows a schematic flowchart of handshake message exchange of a QUIC transport protocol-based communication system according to Embodiment 1 of the present application.

For more clarity, working procedures of the communication system in this embodiment are revealed below with reference to FIGS. 2 and 3.

Step S200: the client computing device 2 sending a first handshake message (Inchoate client hello, inchoate CHLO) to the server computing device 4. The inchoate CHLO message is used to request the server computing device 4 to return a configuration parameter of the server 4 itself.

Step S202: the server computing device 4 receiving the first handshake message, and generating a second handshake message (Rejection, REJ) based on the first handshake message.

The REJ message includes the configuration parameter (server config) of the server computing device 4.

If the server computing device 4 does not support plaintext transport, public key information of a key exchange algorithm, a supported encryption algorithm, the key exchange algorithm, certificate information, etc. are placed in the server config.

If the server computing device 4 supports plaintext transport, public key information of a key exchange algorithm, a supported encryption algorithm, the key exchange algorithm, certificate information, etc. as well as a plaintext-transport tag are placed in the server config. The plaintext-transport tag may be placed in an encryption algorithm option, such as an AEAD (authenticated encryption algorithms) tag. For example, a tag named "NENC" (no encryption) is added to the AEAD tag and used as the plaintext-transport tag.

Step S204: the server computing device 4 sending the second handshake message to the client computing device 2.

Step S206: the client computing device 2 receiving the second handshake message and selecting a target transport mode from a plurality of transport modes based on the second handshake message.

The plurality of transport modes include an encrypted-transport mode corresponding to the encrypted-transport tag and a plaintext-transport mode corresponding to the plaintext-transport tag.

There may be a plurality of encrypted-transport modes, and each of them adapts to a different encryption algorithm. In the plaintext-transport mode, hardware resource consumption during data transport can be reduced.

Step S208: the client computing device 2 being used to define a third handshake message (full client hello, full CHLO) based on the target transport mode and to send the third handshake message to the server computing device 4.

If the target transport mode is the encrypted-transport mode, the third handshake message includes public key information and an initial key of the client computing device 2.

If the target transport mode is the plaintext-transport mode, the third handshake message includes an AEAD tag identifying plaintext transport. To be specific, identification information such as "NENC" for identifying plaintext transport is written into the AEAD tag. In addition, the third handshake message may not include some parameter key values for encryption/decryption, such as a key exchange algorithm, NONC (client nonce consisting of 4 bytes of timestamp, 8 bytes of server computing device orbit, and 20 bytes of random data), SNO (server nonce, which is a nonce of the server computing device), PUBS (a public value of the client computing device for a given key exchange algorithm), and CETV (Client encrypted tag-values, which are tag-values encrypted by the client computing device), to lighten transport load.

Step S210: the server computing device 4 receiving the third handshake message, generating a fourth handshake message (server hello, SHLO) based on the third handshake message, and returning the fourth handshake message to the client computing device 2, so as to establish and perform a QUIC connection corresponding to the target transport mode between the client computing device 2 and the server computing device 4.

The server computing device 4 receives and parses the third handshake message to determine whether the third handshake message has identification information such as "NENC" that identifies plaintext transport. If the third handshake message does not have the identification information such as "NENC" that identifies plaintext transport, the SHLO message is returned to the client computing device 2, where the SHLO message is encrypted using the initial key and contains an ephemeral public value selected by the server computing device 2. If the third handshake message has the identification information such as "NENC" that identifies plaintext transport, the SHLO message is returned to the client computing device 2 in the plaintext-transport mode, that is, the SHLO message is not encrypted, and is returned to the client computing device 2 in plaintext.

After steps S200 to S210, the QUIC handshake process between the client computing device 2 and the server computing device 4 is completed, that is, the QUIC connection is successfully established. It should be noted that both the third handshake message and the fourth handshake message may carry application layer data.

According to the technical solution described in this embodiment, the plurality of transport modes that are encrypted/plaintext are provided, and the client computing device independently selects a transport mode according to its own needs, so as to achieve technical compatibility with the original QUIC transport protocol. It is easily understood that according to the technical solution, a plaintext-transport mode is added to a framework of the QUIC transport protocol, and the plaintext-transport mode may be selected when there is no encryption requirement, thereby not only ensuring transport advantages of the QUIC transport protocol, but also reducing resource consumption caused by a data encryption service.

Embodiment 2

Figure 4:
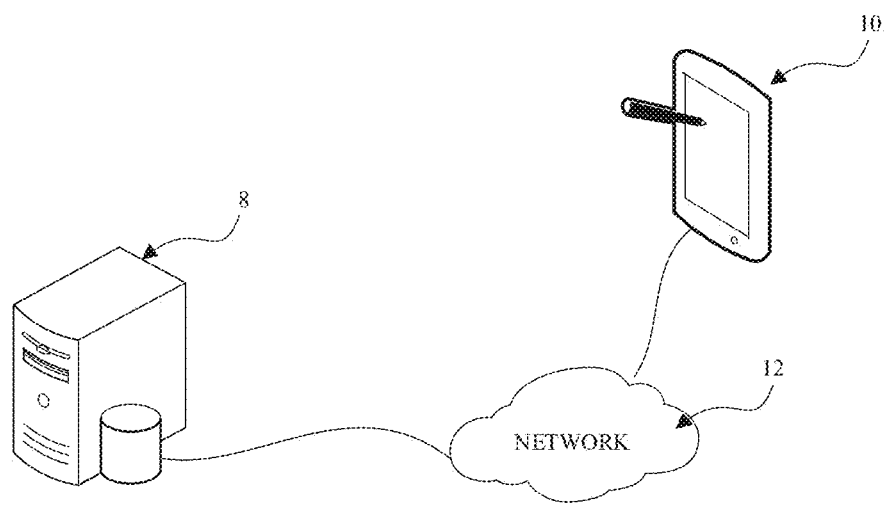
FIG. 4 schematically shows a diagram of an application environment for a QUIC transport protocol-based communication method according to Embodiment 2 of the present application.

FIG. 4 schematically shows a schematic diagram of an QUIC transport protocol based environmental application of a communication method according to Embodiment 2 of the present application. In an exemplary embodiment, a computer device 8 may establish a network connection with a client computing device 10 via a network 12. The computer device 8 and the client computing device 10 each may be an electronic device such as a server, a mobile phone, a tablet personal computer, or a laptop computer. The network 12 may be the Internet.

Figure 5:
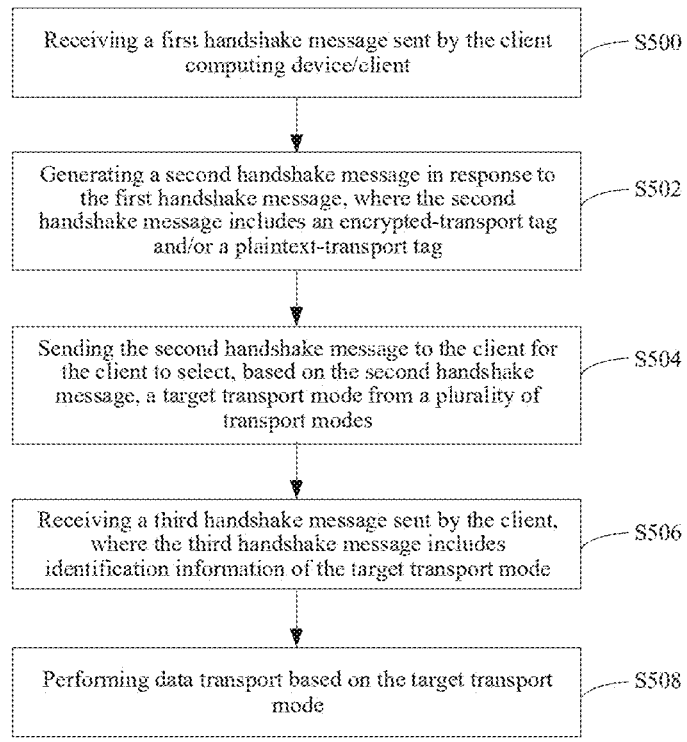
FIG. 5 schematically shows a flowchart of a QUIC transport protocol-based communication method according to Embodiment 2 of the present application.

FIG. 5 schematically shows a flowchart of a QUIC transport protocol-based communication method according to Embodiment 2 of the present application. It can be understood that the flowchart in this method embodiment is not intended to limit the order of execution of the steps. The computer device 8 is used as an execution body below for exemplary description, where the computer device 8 serves as a server computing device to perform a communication operation with the client computing device 10.

As shown in FIG. 5, the communication method may include steps S500 to S508.

Step S500: receiving a first handshake message sent by the client computing device.

When the client computing device 10 is to communicate data (for example, application layer data) with the computer device 8, the client computing device 10 may initiate a QUIC connection request (for example, the first handshake message) based on a QUIC protocol to the computer device 8, so as to establish a QUIC connection between the client computing device 10 and the computer device 8. The first handshake message is also referred to as an inchoate client hello message, which is used to obtain a configuration parameter (server config) and a proof of authenticity from the computer device 8.

Step S502: generating a second handshake message in response to the first handshake message, where the second handshake message includes an encrypted-transport tag and/ or a plaintext-transport tag.

The second handshake message is also referred to as a REJ message, which includes the configuration parameter (server config) of the computer device 8.

After receiving the first handshake message, the computer device 8 will first determine whether the computer device 8 itself supports a plaintext-transport mode. If the plaintext-transport mode is not supported, public key information of a key exchange algorithm, a supported encryption algorithm, the key exchange algorithm, certificate information, etc. are placed in the server config. If plaintext transport is supported, public key information of a key exchange algorithm, a supported encryption algorithm, the key exchange algorithm, certificate information, etc. as well as a plaintext-transport tag are placed in the server config. The plaintext-transport tag may be placed in an encryption algorithm option, such as an AEAD (authenticated encryption algorithms) tag. For example, a tag named "NENC" (no encryption) is added to the AEAD tag and used as the plaintext-transport tag.

Step S504: sending the second handshake message to the client computing device for the client computing device to select, based on the second handshake message, a target transport mode from a plurality of transport modes, where the plurality of transport modes include an encrypted-transport mode corresponding to the encrypted-transport tag and a plaintext-transport mode corresponding to the plaintext-transport tag.

The client computing device 10 may select different transport modes depending on different application scenarios. For example, in a use scenario where security is not required, the plaintext-transport mode may be selected.

The plurality of transport modes include an encrypted-transport mode corresponding to the encrypted-transport tag and a plaintext-transport mode corresponding to the plaintext-transport tag. There may be a plurality of encrypted-transport modes, and each of them adapts to a different encryption algorithm. In the plaintext-transport mode, hardware resource consumption during data transport can be reduced.

Step S506: receiving a third handshake message sent by the client computing device 10, where the third handshake message includes identification information of the target transport mode.

The identification information may be the encrypted-transport tag provided by the second handshake message, or the plaintext-transport tag provided by the second handshake message, or the like.

Step S508: performing data transport based on the target transport mode.

If the target transport mode is the encrypted-transport mode, data transport corresponding to the encrypted-transport mode is performed between the computer device 8 and the client computing device 10. If the target transport mode is the plaintext-transport mode, data transport corresponding to the plaintext-transport mode is performed between the computer device 8 and the client computing device 10.

Figure 6:
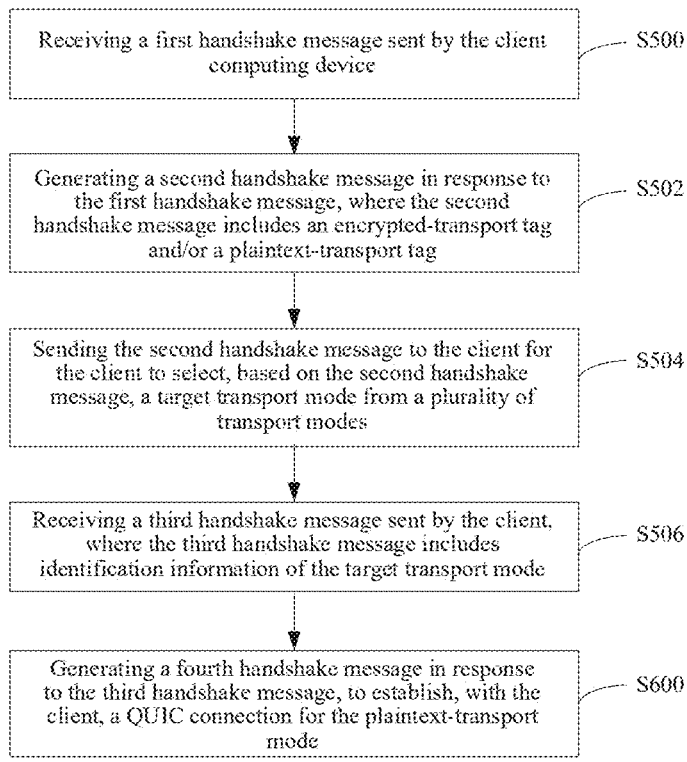
FIG. 6 schematically shows another flowchart of a QUIC transport protocol-based communication method according to Embodiment 2 of the present application.

In an exemplary embodiment, as shown in FIG. 6, step S508 may include step S600. Step S600: generating a fourth handshake message in response to the third handshake message, to establish, with the client computing device, a QUIC connection for the plaintext-transport mode.

The computer device 8 receives and parses the third handshake message, and if the third handshake message contains an AEAD tag that identifies plaintext transport, generates the fourth handshake message and sends the fourth handshake message to the client computing device 10. The third handshake message contains the AEAD tag that identifies plaintext transport, and it indicates that the client computing device 10 has selected the plaintext-transport mode. Therefore, the third handshake message does not need to be encrypted, and can be sent to the client computing device 10 in the plaintext-transport mode. It should be noted that although the third handshake message and subsequent application data do not need to be encrypted, data processing, such as checking, in an encrypter and/or a decrypter is required.

Figure 7:
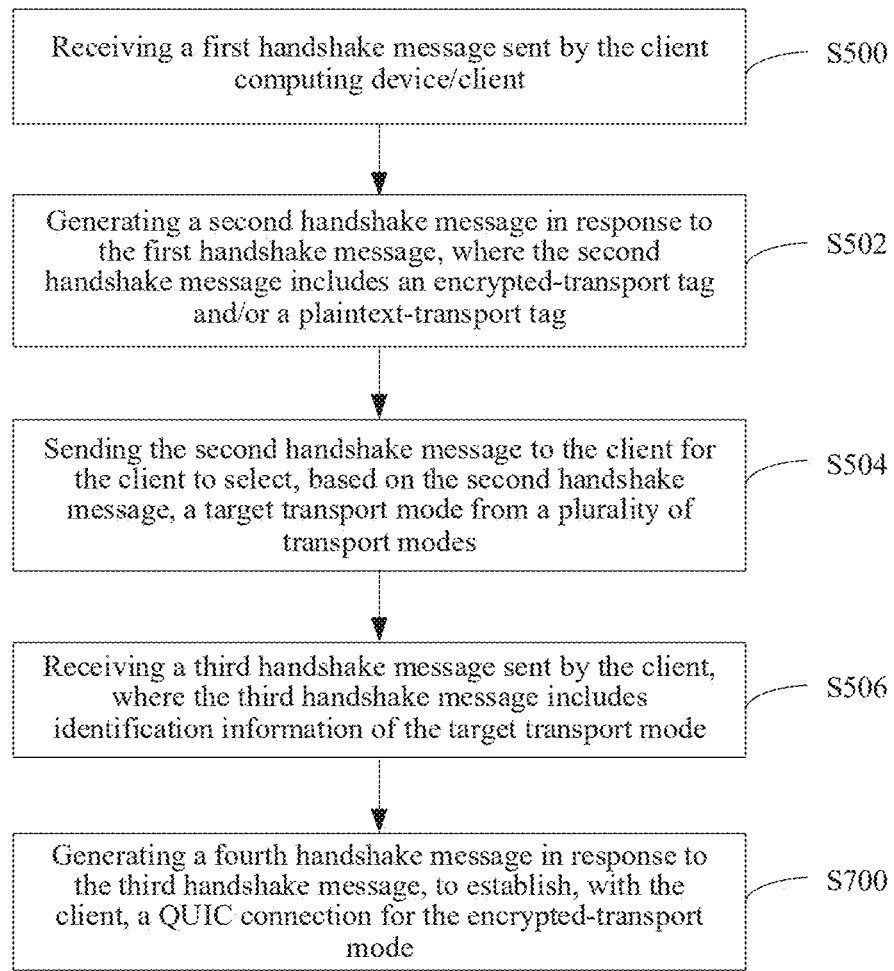
FIG. 7 schematically shows another flowchart of a QUIC transport protocol-based communication method according to Embodiment 2 of the present application.

In an exemplary embodiment, as shown in FIG. 7, step S508 may include step S700: generating a fourth handshake message in response to the third handshake message, to establish, with the client computing device, a QUIC connection for the encrypted-transport mode.

The computer device 8 receives and parses the third handshake message, and if the third handshake message does not contain an AEAD tag that identifies plaintext transport, generates the fourth handshake message and sends the fourth handshake message to the client computing device 10. The third handshake message has no identification information such as "NENC" that identifies plaintext transport, and it indicates that the client computing device 10 has selected the encrypted-transport mode. Therefore, the third handshake message needs to be encrypted.

Embodiment 3

Figure 8:
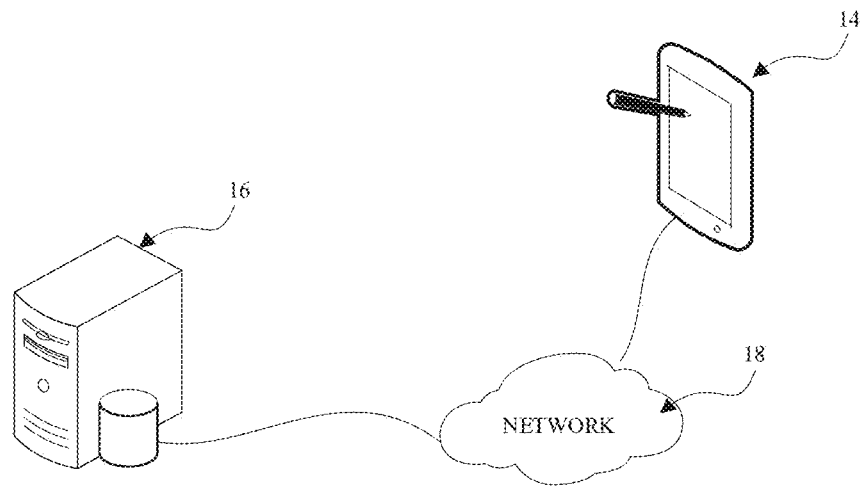
FIG. 8 schematically shows a diagram of an application environment for a QUIC transport protocol-based communication method according to Embodiment 3 of the present application.

FIG. 8 schematically shows a schematic diagram of a QUIC transport protocol based environmental application of a communication method according to Embodiment 3 of the present application. In an exemplary embodiment, a computer device 14 may establish a network connection with a server computing device 16 via a network 18. The computer device 14 and the server computing device 16 each may be an electronic device such as a server, a mobile phone, a tablet personal computer, or a laptop computer. The network 18 may be the Internet.

Figure 9:
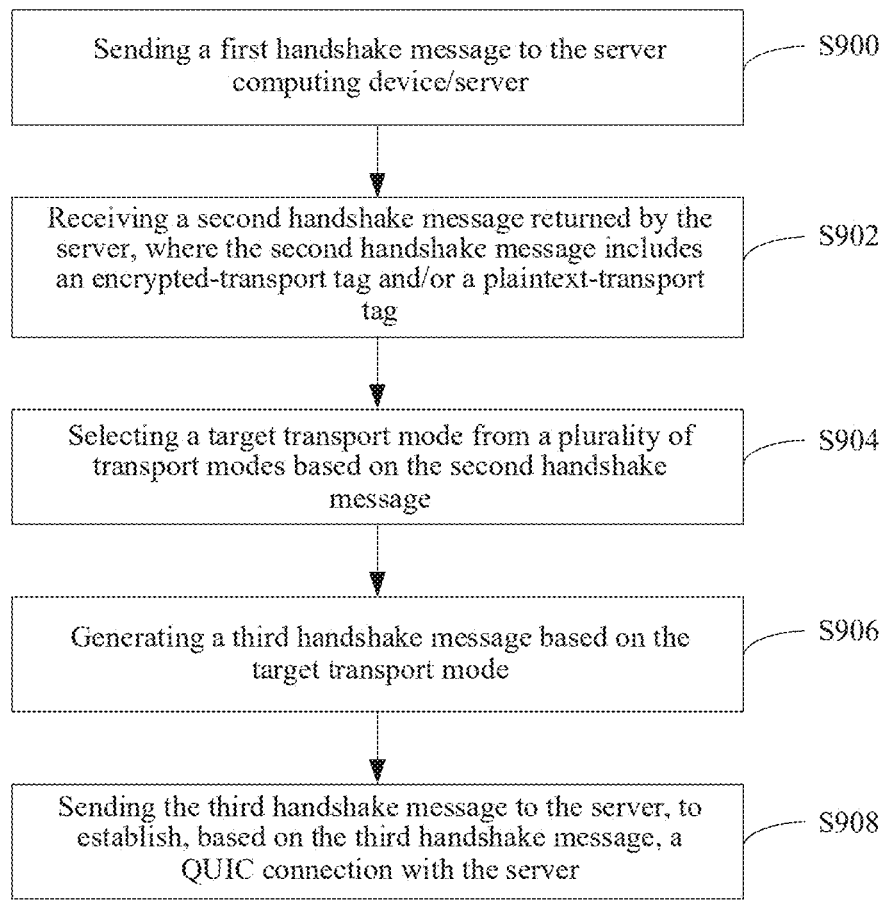
FIG. 9 schematically shows a flowchart of a QUIC transport protocol-based communication method according to Embodiment 3 of the present application.

FIG. 9 schematically shows a flowchart of a QUIC transport protocol-based communication method according to Embodiment 3 of the present application. It can be understood that the flowchart in this method embodiment is not intended to limit the order of execution of the steps. The computer device 14 is used as an execution body below for exemplary description, where the computer device 8 serves as a client computing device to perform a communication operation with the server computing device 16.

As shown in FIG. 9, the communication method may include steps S900 to S908.

Step S900: sending a first handshake message to the server computing device.

The computer device 14 may include an application, and the application 12 may exchange data with the server computing device 16 and display or present content. The content may include video, audio, comments, text data, advertisements, and/or the like.

When the computer device 14 is to communicate data with the server computing device 16, the computer device 14 will initiate, to the server computing device 16, the first handshake message for requesting to establish a QUIC connection. The first handshake message is also referred to as an inchoate client hello message, which is used to obtain a configuration parameter (server config) and a proof of authenticity from the computer device 8.

Step S902: receiving a second handshake message returned by the server computing device, where the second handshake message includes an encrypted-transport tag and/or a plaintext-transport tag.

After receiving the first handshake message, the server computing device 16 will first determine whether the server computing device 16 itself supports a plaintext-transport mode. If the plaintext-transport mode is supported, the plaintext-transport tag is added to the server config, and the corresponding second handshake message is generated. Specifically, the plaintext-transport tag is configured in an encryption algorithm option, such as an AEAD (authenticated encryption algorithms) tag, of the server config in the second handshake message.

Step S904: selecting a target transport mode from a plurality of transport modes based on the second handshake message, where the plurality of transport modes include an encrypted-transport mode corresponding to the encrypted-transport tag and a plaintext-transport mode corresponding to the plaintext-transport tag.

Figure 10:
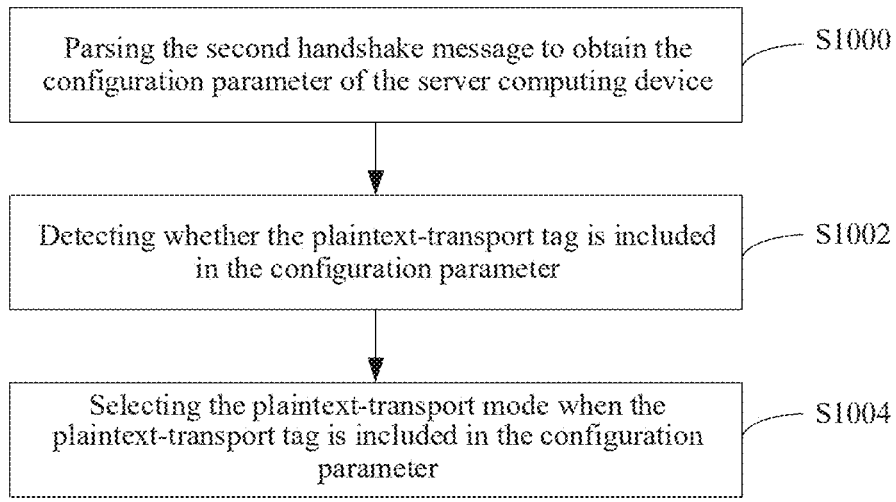
FIG. 10 schematically shows a sub-flowchart of step S904.

The computer device 14 may select different transport modes depending on different application scenarios. For example, in a use scenario where security is not required, the plaintext-transport mode may be selected. In an exemplary embodiment, as shown in FIG. 10, step S904 may include steps S1000 to S1004 as follows: step S1000: parsing the second handshake message to obtain the configuration parameter of the server computing device; step S1002: detecting whether the plaintext-transport tag is in the configuration parameter; and step S1004: selecting the plaintext-transport mode if the plaintext-transport tag is in the configuration parameter.

Step S906: generating a third handshake message based on the target transport mode. The target transport mode may be an encrypted-transport mode corresponding to the encrypted-transport tag or a plaintext-transport mode corresponding to the plaintext-transport tag, or may be another transport mode.

Figure 11:
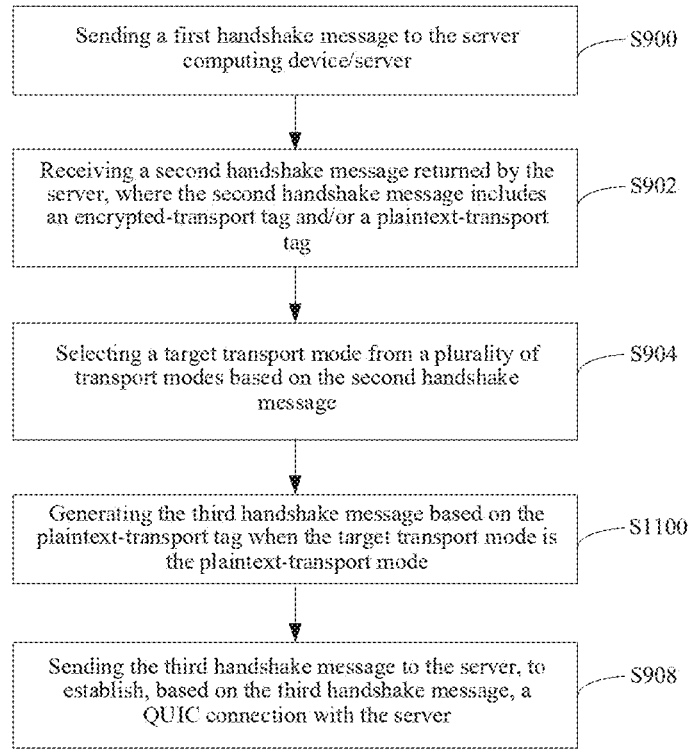
FIG. 11 schematically shows another flowchart of a QUIC transport protocol-based communication method according to Embodiment 3 of the present application.

In an exemplary embodiment, as shown in FIG. 11, step S906 may include step S1100: generating the third handshake message based on the plaintext-transport tag if the target transport mode is the plaintext-transport mode. The computer device 14 may send the third handshake message (full client hello, full CHLO) to perform a handshake that will not fail. The full CHLO includes the plaintext-transport tag, and may not include other tags, for example, may not include the following tags: KEXS, NONC, SNO, PUBS, and CETV.

When the plaintext-transport mode is determined, the computer device 14 may control its built-in encrypter/decrypter to enter a non-encryption mode to process subsequent application data by the encrypter/decrypter in the non-encryption mode, and to send the processed application data to the server computing device.

Since the computer device 14 and the server computing device 16 start attempting a handshake until a connection is established and application data is officially transmitted, two sets of keys are used: INITIAL KEY (initial key) and FORWARD SECURE KEY (forward secure key). They are used by their respective encrypters/decrypters to perform an operation on data, and other rules may also be assigned to the encrypters/decrypters in advance. In order to better reuse code and reduce changes to a structure of the code, a "non-encryption" rule may be assigned to the two encrypters/decrypters in advance, so that the encrypted-transport mode and the plaintext-transport mode can share one encrypter/decrypter. In other words, the encrypter/decrypter also has a non-encryption mode. It should be noted that the plaintext-transport mode does not mean that no operation is to be performed on the application data, but instead the application data is still processed by the encrypter/decrypter in the non-encryption mode, for example, a check code is calculated.

Figure 12:
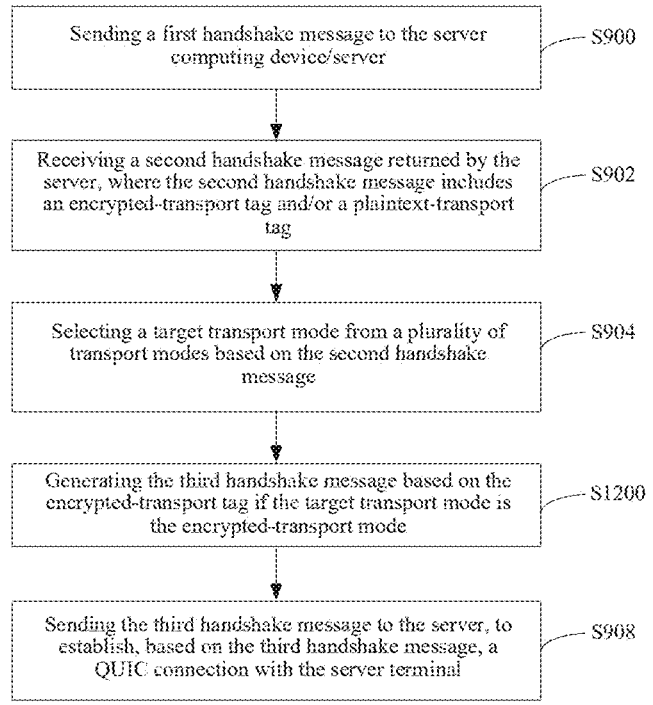
FIG. 12 schematically shows another flowchart of a QUIC transport protocol-based communication method according to Embodiment 3 of the present application.

In an exemplary embodiment, as shown in FIG. 12, step S906 may include step S1200: generating the third handshake message based on the encrypted-transport tag if the target transport mode is the encrypted-transport mode. The computer device 14 receives the second handshake message that carries the server config and completes identity verification by verifying a certificate chain and a signature. Then the third handshake message (full client hello, full CHLO) may be sent, to perform a handshake that will not fail. The full CHLO includes the same tags as the inchoate client hello (inchoate CHLO), and several other tags: SCID, AEAD, KEXS, NONC, SNO, PUBS, and CETV (a tag value encrypted by the client computing device) are also added.

Step S908: sending the third handshake message to the server computing device, to establish, based on the third handshake message, a QUIC connection with the server computing device.

Figure 13:
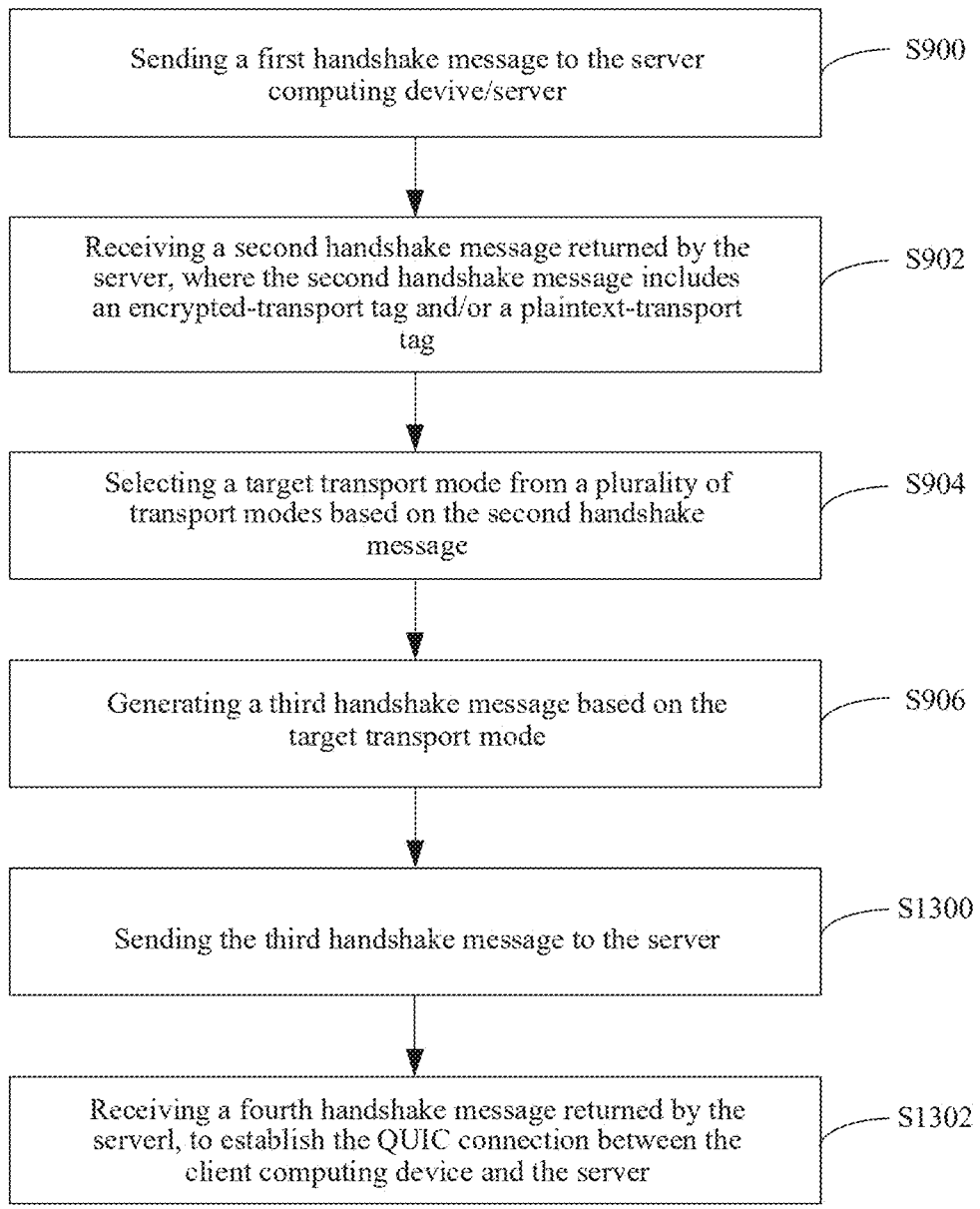
FIG. 13 schematically shows another flowchart of a QUIC transport protocol-based communication method according to Embodiment 3 of the present application.

In an exemplary embodiment, as shown in FIG. 13, step S906 may include steps S1300 and S1302 as follows: step S1300: sending the third handshake message to the server computing device 16; and step S1302: receiving a fourth handshake message returned by the server computing device 16, to establish the QUIC connection between the computer device 14 and the server computing device 16.

Embodiment 4

Figure 14:
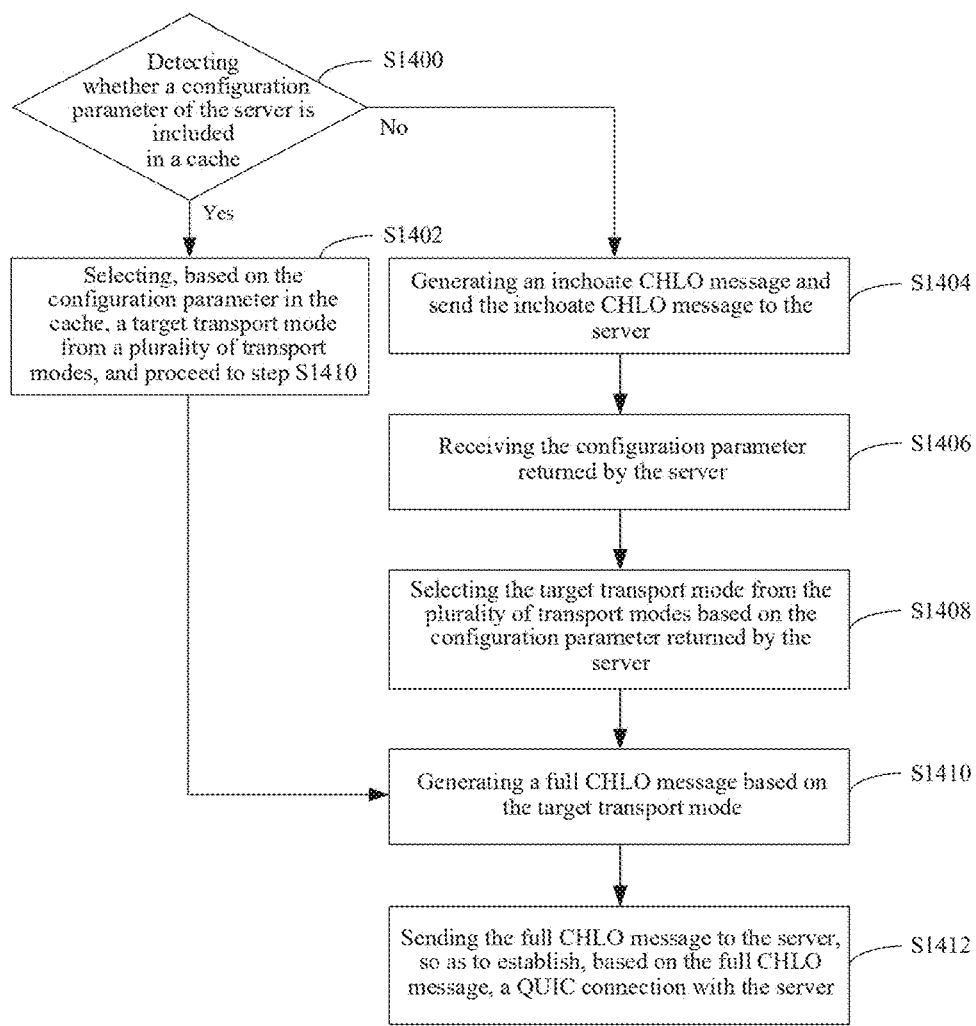
FIG. 14 schematically shows a flowchart of a QUIC transport protocol-based communication method according to Embodiment 4 of the present application.

FIG. 14 schematically shows a flowchart of a QUIC transport protocol-based communication method according to Embodiment 4 of the present application. It can be understood that the flowchart in this method embodiment is not intended to limit the order of execution of the steps. The computer device 14 is used as an execution body below for exemplary description, where the computer device 8 serves as a client computing device to perform a communication operation with the server computing device 16.

The communication method may include steps S1400 to S1412.

Step S1400: detecting whether a configuration parameter of the server computing device 16 is in a buffer, where the configuration parameter includes an encrypted-transport tag and/or a plaintext-transport tag. If the configuration parameter of the server computing device 16 is in the buffer, the method proceeds to step S1402; otherwise, the method proceeds to step S1404.

The configuration parameter may be a parameter obtained during a previous QUIC connection, and remains effective for a specific period of time. Therefore, the configuration parameter can continue to be used to establish the current QUIC connection, such that this QUIC connection can achieve 0-RTT (round-trip time).

Step S1402: selecting, based on the configuration parameter in the buffer, a target transport mode from a plurality of transport modes, and proceed to step S1410.

The plurality of transport modes include an encrypted-transport mode corresponding to the encrypted-transport tag and a plaintext-transport mode corresponding to the plaintext-transport tag.

Step S1404: generating an inchoate CHLO message and send the inchoate CHLO message to the server computing device, where the inchoate CHLO message is used to request the server computing device to return the configuration parameter.

Step S1406: receiving the configuration parameter returned by the server computing device, where the configuration parameter includes the encrypted-transport tag and/or the plaintext-transport tag.

Step S1408: selecting the target transport mode from the plurality of transport modes based on the configuration parameter returned by the server computing device.

Step S1410: generating a full CHLO message based on the target transport mode, where the full CHLO message is used to request the server computing device to generate a forward secure key.

Step S1412: sending the full CHLO message to the server computing device, so as to establish, based on the full CHLO message, a QUIC connection with the server computing device.

Embodiment 5

Figure 15:
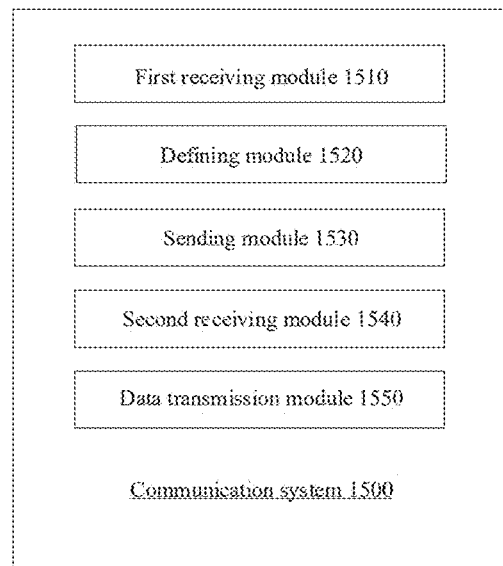
FIG. 15 schematically shows a block diagram of a communication system according to Embodiment 5 of the present application.

FIG. 15 schematically shows a block diagram of a communication system according to Embodiment 5 of the present application. The communication system may be split into one or more program modules. The one or more program modules are stored in a storage medium, and are executed by one or more processors to complete the embodiments of the present application. The program modules mentioned in this embodiment of the present application refer to a series of computer-readable instruction segments that can complete specific functions. Functions of various program modules in this embodiment will be specifically described below.

As shown in FIG. 15, the communication system 1500 may include a receiving module 1510, a generating module 1520, a sending module 1530, a second receiving module 1540, and a data transport module 1550.

The first receiving module 1510 is used to receive a first handshake message sent by a client computing device.

The generating module 1520 is used to define a second handshake message in response to the first handshake message, where the second handshake message includes an encrypted-transport tag and/or a plaintext-transport tag.

The sending module 1530 is used to send the second handshake message to the client computing device for the client computing device to select, based on the second handshake message, a target transport mode from a plurality of transport modes, where the plurality of transport modes include an encrypted-transport mode corresponding to the encrypted-transport tag and a plaintext-transport mode corresponding to the plaintext-transport tag.

The second receiving module 1540 is used to receive a third handshake message sent by the client computing device, where the third handshake message includes identification information of the target transport mode.

The data transport module 1550 is used to perform data transport based on the target transport mode.

In an exemplary embodiment, the second handshake message includes a configuration parameter of the server computing device, and the plaintext-transport tag is configured in an encryption algorithm option of the configuration parameter.

In an exemplary embodiment, the identification information includes the encrypted-transport tag provided by the second handshake message; and the data transport module 1550 is further used to: define a fourth handshake message in response to the third handshake message, to establish, with the client computing device, a QUIC connection for the plaintext-transport mode.

In an exemplary embodiment, the identification information includes the plaintext-transport tag provided by the second handshake message; and the data transport module 1550 is further used to: define a fourth handshake message in response to the third handshake message, to establish, with the client computing device, a QUIC connection for the encrypted-transport mode.

Embodiment 6

Figure 16:
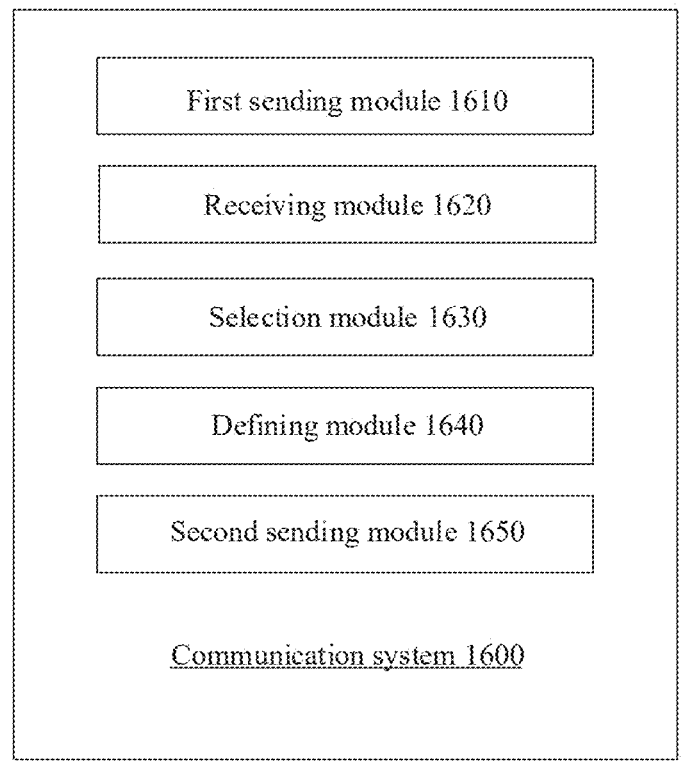
FIG. 16 schematically shows a block diagram of a communication system according to Embodiment 6 of the present application.

FIG. 16 schematically shows a block diagram of a communication system according to Embodiment 6 of the present application. The communication system may be split into one or more program modules. The one or more program modules are stored in a storage medium, and are executed by one or more processors to complete the embodiments of the present application. The program modules mentioned in this embodiment of the present application refer to a series of computer-readable instruction segments that can complete specific functions. Functions of various program modules in this embodiment will be specifically described below.

As shown in FIG. 16, the communication system 1600 may include a first sending module 1610, a receiving module 1620, a selection module 1630, a generating module 1640, and a second sending module 1650.

The first sending module 1610 is used to send a first handshake message to a server computing device.

The receiving module 1620 is used to receive a second handshake message returned by the server computing device, where the second handshake message includes an encrypted-transport tag and/or a plaintext-transport tag.

The selection module 1630 is used to select, based on the second handshake message, a target transport mode from a plurality of transport modes, where the plurality of transport modes include an encrypted-transport mode corresponding to the encrypted-transport tag and a plaintext-transport mode corresponding to the plaintext-transport tag.

The generating module 1640 is used to define a third handshake message based on the target transport mode.

The second sending module 1650 is used to send the third handshake message to the server computing device, to establish, based on the third handshake message, a QUIC connection with the server computing device.

In an exemplary embodiment, the second handshake message includes a configuration parameter of the server computing device, and the plaintext-transport tag is configured in an encryption algorithm option of the configuration parameter.

In an exemplary embodiment, the selection unit 1630 is further used to: parse the second handshake message to obtain the configuration parameter of the server computing device; detect whether the plaintext-transport tag is in the configuration parameter; and if the plaintext-transport tag is in the configuration parameter, select the plaintext-transport mode.

In an exemplary embodiment, the generating module 1640 is further used to: if the target transport mode is the plaintext-transport mode, define the third handshake message according to the plaintext-transport tag.

In an exemplary embodiment, the generating module 1640 is used to: if the target transport mode is the encrypted-transport mode, define the third handshake message according to the encrypted-transport tag.

In an exemplary embodiment, the second sending module 1650 is further used to: send the third handshake message to the server computing device; and receive a fourth handshake message returned by the server computing device, to establish the QUIC connection with the server computing device.

Embodiment 7

Figure 17:
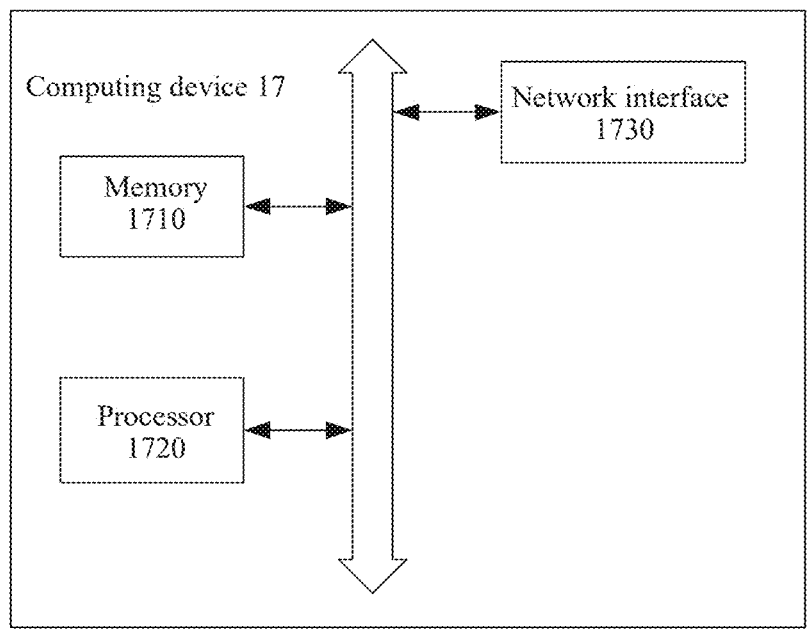
FIG. 17 schematically shows a schematic diagram of a hardware architecture of a computer device suitable for implementing a communication method according to Embodiment 7 of the present application.

FIG. 17 schematically shows a schematic diagram of a hardware architecture of a computer device 17 suitable for implementing a communication method according to Embodiment 7 of the present application. The computer device 17 is applicable to the client computing device and the server computing device in Embodiment 1, and can also be used as the computer devices 8 and 14 in Embodiments 2, 3, and 4. In this embodiment, the computer device 17 is a device that can automatically perform numerical calculation and/or information processing according to preset or prestored instructions. For example, the computer device 17 may be a smartphone, a tablet computer, a notebook computer, a desktop computer, a rack server, a blade server, a tower server, or a cabinet server (including a standalone server or a server cluster consisting of a plurality of servers). As shown in FIG. 17, the computer device 17 includes but is not limited to at least: a memory 1710, a processor 1720, and a network interface 1730 that can be communicatively connected to each other using a system bus.

The memory 1710 includes at least one type of computer-readable storage medium, and the readable storage medium includes a flash memory, a hard disk, a multimedia card, a card-type memory (e.g., an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the memory 1710 may be an internal storage module of the computer device 17, for example, a hard disk or a memory of the computer device 17. In some other embodiments, the memory 1710 may alternatively be an external storage device of the computer device 17, for example, a plug-in hard disk provided on the computer device 17, a smart media card (SMC), a secure digital (SD) card, or a flash card. Certainly, the memory 1710 may alternatively include both an internal storage module of the computer device 17 and an external storage device thereof. In this embodiment, the memory 1710 is generally configured to store an operating system and various application software installed on the computer device 17, for example, program code for a QUIC transport protocol-based communication method. In addition, the memory 1710 may be further configured to temporarily store various types of data that has been output or will be output.

The processor 1720 may be, in some embodiments, a central processing unit (CPU), a controller, a microcontroller, a microprocessor, or another data processing chip. The processor 1720 is generally configured to control overall operations of the computer device 17, for example, perform data exchange or communication-related control and processing with the computer device 17. In this embodiment, the processor 1720 is used to run program code stored in the memory 1710 or process data.

The network interface 1730 may include a wireless network interface or a wired network interface, and the network interface 1730 is generally configured to establish a communication connection between the computer device 17 and other computer devices. For example, the network interface 1730 is used to connect the computer device 17 to an external computing device via a network, and establish a data transport channel, a communication link, etc. between the computer device 17 and the external computing device. The network may be a wireless or wired network such as an enterprise intranet (Intranet), the Internet, global system for mobile communications (GSM), wideband code division multiple access (WCDMA), a 4G network, a 5G network, Bluetooth, or Wi-Fi.

It should be noted that FIG. 17 shows only the computer device having components 1710 to 1730, but it should be understood that not all of the illustrated components are required to be implemented, and more or fewer components may be implemented instead.

In this embodiment, the communication method stored in the memory 1710 may alternatively be split into one or more program modules and executed by one or more processors (the processor 1720 in this embodiment) to complete the present application.

Embodiment 8

This embodiment further provides a computer-readable storage medium, where the computer-readable storage medium stores computer-readable instructions, and when the computer-readable instructions are executed by a processor, the steps of a QUIC transport protocol-based communication method in the embodiments are implemented.

In this embodiment, the computer-readable storage medium includes a flash memory, a hard disk, a multimedia card, a card-type memory (e.g., an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the computer-readable storage medium may be an internal storage unit of the computer device, for example, a hard disk or a memory of the computer device.

In some other embodiments, the computer-readable storage medium may alternatively be an external storage device of the computer device, for example, a plug-in hard disk provided on the computer device, a smart media card (SMC), a secure digital (SD) card, or a flash card. Certainly, the computer-readable storage medium may alternatively include both an internal storage unit of the computer device and an external storage device thereof. In this embodiment, the computer-readable storage medium is generally configured to store an operating system and various application software installed on the computer device, for example, program code for a QUIC transport protocol-based communication method in the embodiments. In addition, the computer-readable storage medium may be further configured to temporarily store various types of data that has been output or will be output.

Apparently, persons skilled in the art should be aware that the various modules or steps described above in the embodiments of the present application may be implemented by a general-purpose computing apparatus. They may be concentrated on a single computing apparatus or distributed on a network formed by a plurality of computing apparatuses. Optionally, they may be implemented using program code executable by the computing apparatus, and therefore may be stored in a storage apparatus and executed by the computing apparatus. In addition, in some cases, the steps shown or described may be performed in a sequence different from the sequence described herein, or they may be respectively fabricated into individual integrated circuit modules, or a plurality of modules or steps thereof may be fabricated into individual integrated circuit modules for implementation. In this way, the embodiments of the present application are not limited to any specific combination of hardware and software.

Only preferred embodiments of the present application are described above, which are not intended to limit the patent scope of the present application. Any equivalent structure or equivalent process transformation made using the content of the specification and accompanying drawings of the present application, or any direct or indirect application thereof in other related technical fields shall equally fall within the patent protection scope of the present application.

What is claimed is:

1. A communication method based on Quick UDP Internet Connection (QUIC) transport protocol, comprising:
   receiving at a server computing device a first handshake message sent by a client computing device;
   in response to the first handshake message, generating by the server computing device a second handshake message, wherein the second handshake message comprises at least two tags, and wherein a first one of the at least two tags is an encrypted-transport tag and a second one of the at least two tags is a plaintext-transport tag;
   sending the second handshake message from the server computing device to the client computing device, wherein a target transport mode is selected by the client computing device from a plurality of transport modes based on the at least two tags in the second handshake message sent by the server computing device, wherein the plurality of transport modes comprise an encrypted-transport mode corresponding to the encrypted-transport tag and a plaintext-transport mode corresponding to the plaintext-transport tag, wherein the second handshake message further comprises an AEAD encryption algorithm field containing the plaintext-transport tag, and wherein the client computing device selects the plaintext-transport mode by parsing the AEAD encryption algorithm field;
   receiving a third handshake message sent by the client computing device, wherein the third handshake message comprises identification information of the target transport mode for establishing a QUIC connection with the client computing device; and
   performing data transport based on the target transport mode.

2. The communication method according to claim 1, wherein the second handshake message comprises configuration parameters of the server computing device, and wherein the plaintext-transport tag is configured in an encryption algorithm option of the configuration parameters.

3. The communication method according to claim 1, wherein the identification information comprises the encrypted-transport tag provided by the second handshake message, and wherein the performing data transport based on the target transport mode comprises:
   in response to the third handshake message, generating a fourth handshake message to establish, with the client computing device, the QUIC connection for the encrypted-transport mode.

4. The communication method according to claim 1, wherein the identification information comprises the plaintext-transport tag provided by the second handshake message, and wherein the performing data transport based on the target transport mode comprises:
   in response to the third handshake message, generating a fourth handshake message to establish, with the client computing device, the QUIC connection for the plaintext-transport mode.

5. A communication system based on Quick UDP Internet Connection (QUIC) transport protocol, comprising:
   at least one processor; and
   at least one memory communicatively coupled to the at least one processor and comprising computer-readable instructions that upon execution by the at least one processor cause a server computing device to perform operations comprising:
   receiving at the server computing device a first handshake message sent by a client computing device;
   in response to the first handshake message, generating by the server computing device a second handshake message, wherein the second handshake message comprises at least two tags, and wherein a first one of the at least two tags is an encrypted-transport tag and a second one of the at least two tags is a plaintext-transport tag;
   sending the second handshake message from the server computing device to the client computing device, wherein a target transport mode is selected by the client computing device from a plurality of transport modes based on the at least two tags in the second handshake message sent by the server computing device, and wherein the plurality of transport modes comprises an encrypted-transport mode corresponding to the encrypted-transport tag and a plaintext-transport mode corresponding to the plaintext-transport tag, wherein the second handshake message further comprises an AEAD encryption algorithm field containing the plaintext-transport tag, and wherein the client computing device selects the plaintext-transport mode by parsing the AEAD encryption algorithm field;
   receiving a third handshake message sent by the client computing device, wherein the third handshake message comprises identification information of the target transport mode for establishing a QUIC connection with the client computing device; and performing data transport based on the target transport mode.

6. The communication system according to claim 5, wherein the second handshake message comprises configuration parameters of a server computing device, and wherein the plaintext-transport tag is configured in an encryption algorithm option of the configuration parameters.

7. A communication method based on Quick UDP Internet Connection (QUIC) transport protocol, comprising:

sending a first handshake message to a server computing device from a client computing device;

receiving by the client computing device a second handshake message returned by the server computing device, wherein the second handshake message comprises at least two tags, and wherein a first one of the at least two tags is an encrypted-transport tag and a second one of the at least two tags is a plaintext-transport tag;

selecting a target transport mode from a plurality of transport modes based on the at least two tags in the second handshake message sent from the server computing device, wherein the plurality of transport modes comprise an encrypted-transport mode corresponding to the encrypted-transport tag and a plaintext-transport mode corresponding to the plaintext-transport tag, wherein the second handshake message further comprises an AEAD encryption algorithm field containing the plaintext-transport tag, and wherein the client computing device selects the plaintext-transport mode by parsing the AEAD encryption algorithm field;

generating a third handshake message by the client computing device based on the target transport mode; and sending the third handshake message to the server computing device to establish a QUIC connection with the server computing device based on the third handshake message.

8. The communication method according to claim 7, wherein the second handshake message comprises configuration parameters of the server computing device, and wherein the plaintext-transport tag is configured in an encryption algorithm option of the configuration parameters.

9. The communication method according to claim 7, wherein selecting the target transport mode from the plurality of transport modes based on the second handshake message comprises:

parsing the second handshake message to obtain configuration parameters of the server computing device;

detecting whether the configuration parameters comprise the plaintext-transport tag; and selecting the plaintext-transport mode in response to detecting that the configuration parameters comprise the plaintext-transport tag.

10. The communication method according to claim 7, wherein generating the third handshake message based on the target transport mode comprises:

generating the third handshake message based on the plaintext-transport tag in response to determining that the target transport mode is the plaintext-transport mode.

11. The communication method according to claim 10, further comprising:

controlling an encrypter and a decrypter to enter a non-encryption mode;

processing subsequent data by the encrypter and the decrypter in the non-encryption mode; and sending the processed data to the server computing device.

12. The communication method according to claim 7, wherein generating the third handshake message based on the target transport mode comprises:

generating the third handshake message based on the encrypted-transport tag when the target transport mode is the encrypted-transport mode.

13. The communication method according to claim 7, wherein sending the third handshake message to the server computing device to establish the QUIC connection with the server computing device based on the third handshake message comprises:

sending the third handshake message to the server computing device; and receiving a fourth handshake message returned by the server computing device and establishing the QUIC connection with the server computing device.

14. The communication method according to claim 7, wherein before sending the first handshake message to the server computing device, the communication method further comprises:

detecting whether a buffer comprises configuration parameters of the server computing device, wherein the configuration parameters comprise the encrypted-transport tag and the plaintext-transport tag;

in response to detecting that the buffer comprises the configuration parameters, selecting the target transport mode from the plurality of transport modes based on the configuration parameters in the buffer, wherein the plurality of transport modes comprises the encrypted-transport mode corresponding to the encrypted-transport tag and the plaintext-transport mode corresponding to the plaintext-transport tag;

generating a full Client Hello (CHLO) message based on the target transport mode, wherein the full CHLO message is configured to request the server computing device to generate a forward secure key; and sending the full CHLO message to the server computing device and establish a QUIC connection with the server computing device based on the full CHLO message.

15. The communication method according to claim 14, wherein when the buffer does not comprise the configuration parameters, the communication method further comprises:

generating an inchoate CHLO message and sending the inchoate CHLO message to the server computing device, wherein the inchoate CHLO message is configured to request the server computing device to return the configuration parameters;

receiving the configuration parameters returned by the server computing device, wherein the configuration parameters comprise the encrypted-transport tag and the plaintext-transport tag; and selecting the target transport mode from the plurality of transport modes based on the configuration parameters returned by the server computing device.

16. A communication system comprising a client computing device based on Quick UDP Internet Connection (QUIC) transport protocol, comprising:

at least one processor; and at least one memory communicatively coupled to the at least one processor and comprising computer-readable instructions that upon execution by the at least one processor cause the client computing device to perform operations comprising:

sending a first handshake message to a server computing device;

receiving by the client computing device a second handshake message returned by the server computing device, wherein the second handshake message comprises at least two tags, and wherein a first one of the at least two tags is an encrypted-transport tag and a second one of the at least two tags is a plaintext-transport tag;

selecting, based on the at least two tags in the second handshake message sent from the server computing device, a target transport mode from a plurality of transport modes, wherein the plurality of transport modes comprise an encrypted-transport mode corresponding to the encrypted-transport tag and a plaintext-transport mode corresponding to the plaintext-transport tag, wherein the second handshake message further comprises an AEAD encryption algorithm field containing the plaintext-transport tag, and wherein the client computing device selects the plaintext-transport mode by parsing the AEAD encryption algorithm field;

generating a third handshake message by the client computing device based on the target transport mode; and sending the third handshake message to the server computing device to establish a QUIC connection with the server computing device based on the third handshake message.

17. The communication system according to claim 16, wherein the second handshake message comprises configuration parameters of the server computing device, and wherein the plaintext-transport tag is configured in an encryption algorithm option of the configuration parameters.

18. The communication system according to claim 16, the operations further comprising:

parsing the second handshake message to obtain configuration parameters of the server computing device;

detecting whether the configuration parameters comprise the plaintext-transport tag; and selecting the plaintext-transport mode in response to detecting that the configuration parameters comprise the plaintext-transport tag.

19. The communication system according to claim 16, the operations further comprising:

generating the third handshake message based on the plaintext-transport tag in response to determining that the target transport mode is the plaintext-transport mode.

20. The communication system according to claim 19, the operations further comprising:

controlling an encrypter and a decrypter to enter a non-encryption mode;

processing subsequent data by the encrypter and the decrypter in the non-encryption mode; and sending the processed data to the server computing device.

* * * * *